United States Patent
Ueda et al.

(10) Patent No.: US 8,958,655 B2
(45) Date of Patent: Feb. 17, 2015

(54) IMAGE PROCESSOR, IMAGE PROCESSING METHOD, AND COMPUTER READABLE MEDIUM

(75) Inventors: Atsushi Ueda, Tokyo (JP); Jun Minakuti, Tokyo (JP)

(73) Assignee: Sony Corporation, Tokyo (JP)

(*) Notice: Subject to any disclaimer, the term of this patent is extended or adjusted under 35 U.S.C. 154(b) by 214 days.

(21) Appl. No.: 13/589,673

(22) Filed: Aug. 20, 2012

(65) Prior Publication Data
US 2013/0071042 A1 Mar. 21, 2013

(30) Foreign Application Priority Data
Sep. 15, 2011 (JP) ................................. 2011-201501

(51) Int. Cl.
*G06K 9/44* (2006.01)
*H04N 5/262* (2006.01)
*H04N 5/232* (2006.01)

(52) U.S. Cl.
CPC ........... *H04N 5/262* (2013.01); *H04N 5/23229* (2013.01)
USPC ........... 382/255; 382/264; 382/274; 358/537; 358/538

(58) Field of Classification Search
USPC ................... 382/255, 264, 274; 358/537, 538
See application file for complete search history.

(56) References Cited

U.S. PATENT DOCUMENTS

| | | | | |
|---|---|---|---|---|
| 6,801,642 B2* | 10/2004 | Gorday et al. | ................ | 382/118 |
| 7,471,830 B2* | 12/2008 | Lim et al. | ...................... | 382/181 |
| 7,928,983 B2* | 4/2011 | Pedersen et al. | ............... | 345/442 |
| 7,948,903 B2* | 5/2011 | Fang | ............................. | 370/241 |
| 7,978,253 B2* | 7/2011 | Watanabe | ..................... | 348/345 |
| 8,094,207 B2* | 1/2012 | Yoneyama | ................ | 348/222.1 |
| 8,350,954 B2* | 1/2013 | Hamano | ....................... | 348/349 |
| 8,395,694 B2* | 3/2013 | Kim | .............................. | 348/345 |
| 8,407,093 B2* | 3/2013 | Cartmell | ................... | 705/14.64 |
| 8,442,346 B2* | 5/2013 | Lee et al. | ....................... | 382/266 |
| 8,655,093 B2* | 2/2014 | El Dokor et al. | ............. | 382/254 |

FOREIGN PATENT DOCUMENTS

JP 2008-118348 A 5/2008

* cited by examiner

*Primary Examiner* — Yosef Kassa
(74) *Attorney, Agent, or Firm* — Oblon, Spivak, McClelland, Maier & Neustadt, L.L.P.

(57) ABSTRACT

An apparatus includes an attention region determining unit and a blurring unit. The attention region determining unit is configured to determine an attention region of an image that includes an intended subject of the image. The blurring unit is configured to blur all of the image regions outside of the attention region.

18 Claims, 14 Drawing Sheets

IMAGE PROCESSOR, IMAGE PROCESSING METHOD, AND COMPUTER READABLE MEDIUM

CROSS-REFERENCE TO RELATED APPLICATIONS

The present application is based upon and claims the benefit of priority under 35 U.S.C. §119 of Japanese Priority Patent Application JP 2011-201501 filed in the Japanese Patent Office on Sep. 15, 2011, the entire contents of which are hereby incorporated by reference.

BACKGROUND

The present disclosure relates to an image processor, an image processing method, and a program encoded on a non-transitory computer readable medium.

In recent days, various imaging modes tend to be implemented with imaging apparatuses. For example, according to a miniature mode, it is possible to make an image at the time of imaging or an image after imaging to be an image as a miniature with a shallow depth of field.

Regarding such a miniature mode, for example in Japanese Unexamined Patent Application Publication No. 2008-118348, an imaging apparatus is disclosed that applies blurring to a background region not including a main subject to a degree in accordance with the focal length of the lens. Japanese Unexamined Patent Application Publication No. 2008-118348 describes an example of determining the main subject region to be a region corresponding to the focus position in the image and an example of determining the main subject region, in a case that a plurality of face regions are extracted as the subject, on the basis of a face region largest in size or a face region closest to the center.

SUMMARY

However, different results are obtained between a case of determining an attention region not to apply blurring from an image containing a plurality of focus positions on the basis of one focus position and a case of determining it on the basis of a plurality of focus positions. Accordingly, when determining the attention region generically on the basis of one focus position, a case may arise that a result expected by a user is not obtained.

It is desirable to propose a novel and improved image processor, an image processing method, and a program that is possible to appropriately determine an attention region in an image based on imaging information.

The present invention broadly comprises an image processor, an image processing method, and a program encoded on a non-transitory computer readable medium. In one embodiment, an apparatus includes an attention region determining unit and a blurring unit. The attention region determining unit is configured to determine an attention region of an image that includes an intended subject of the image. The blurring unit is configured to blur all of the image regions outside of the attention region.

According to another embodiment of the present disclosure, there is provided an image processor including an attention region determination unit determining an attention region, following an approach in accordance with imaging information obtained upon imaging an input image out of a plurality of approaches, in the input image, and an image processing unit applying blurring to a surrounding region not included in the attention region.

In addition, according to another embodiment of the present disclosure, there is provided an image processing method including determining an attention region, following an approach in accordance with imaging information obtained upon imaging an input image out of a plurality of approaches, in the input image, and applying blurring to a surrounding region not included in the attention region.

Still in addition, according to still another embodiment of the present disclosure, there is provided a program causing a computer to execute functions including an attention region determination unit determining an attention region, following an approach in accordance with imaging information obtained upon imaging an input image out of a plurality of approaches, in the input image, and an image processing unit applying blurring to a surrounding region not included in the attention region.

As described above, according to an embodiment of the present disclosure, an attention region in an image can be determined appropriately based on imaging information.

DETAILED DESCRIPTION OF EMBODIMENTS

Figure 1:
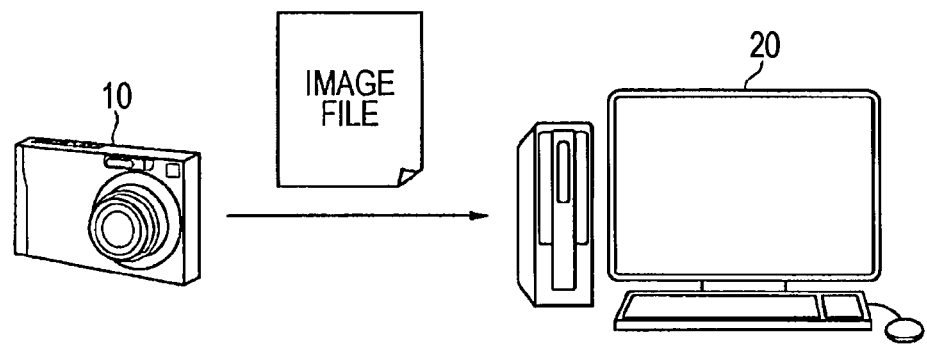
FIG. 1 illustrates a configuration of an image processing system according to an embodiment of the present disclosure.

With reference to the attached drawings, a detailed description is given below to preferred embodiments of the present disclosure. In this specification and the drawings, a repetitive description is omitted by assigning an identical reference numeral to a component having a substantially identical functional configuration.

In this specification and the drawings, a plurality of components having a substantially identical functional configuration may also be distinguished by assigning a different alphabet after an identical reference numeral. When the plurality of components having a substantially identical functional configuration are not particularly distinguished, only an identical reference numeral is assigned.

Embodiments of the present disclosure are described in accordance with the following article order.

1. Basic Configuration of Image Processing System
   2. Configuration of Image Processor
   3. Function of Image Processor
      3-1. First Functional Example
      3-2. Second Functional Example
   4. Hardware Configuration
   5. Closing <1. Basic Configuration of Image Processing System>

A technique according to an embodiment of the present disclosure can be carried out in modes as described in detail in, as an example, "2. Configuration of Image Processor" and "3. Function of Image Processor". An image processor 20 according to an embodiment of the present disclosure includes:

A. an attention region determination unit determining an attention region, following an approach in accordance with imaging information obtained upon imaging an input image out of a plurality of approaches, in the input image; and B. an image processing unit applying blurring to a surrounding region not included in the attention region.

In the following description, firstly, a description is given to a basic configuration of an image processing system including such an image processor.

FIG. 1 illustrates a configuration of an image processing system 1 according to an embodiment of the present disclosure. As shown in FIG. 1, the image processing system 1 according to an embodiment of the present disclosure is provided with an imaging apparatus 10 and an image processor 20.

(Imaging Apparatus 10)

The imaging apparatus 10 obtains an image by imaging a subject. Specifically, the imaging apparatus 10 is provided with an imaging optical system, such as an imaging lens and a zoom lens, and an imaging device, such as a CCD (charge coupled device) or a CMOS (complementary metal oxide semiconductor). The imaging optical system collects lights emitted from a subject to form a subject image on an imaging plane of the imaging device. The imaging device converts the subject image formed by the imaging optical system into an electrical image signal.

Figure 2:
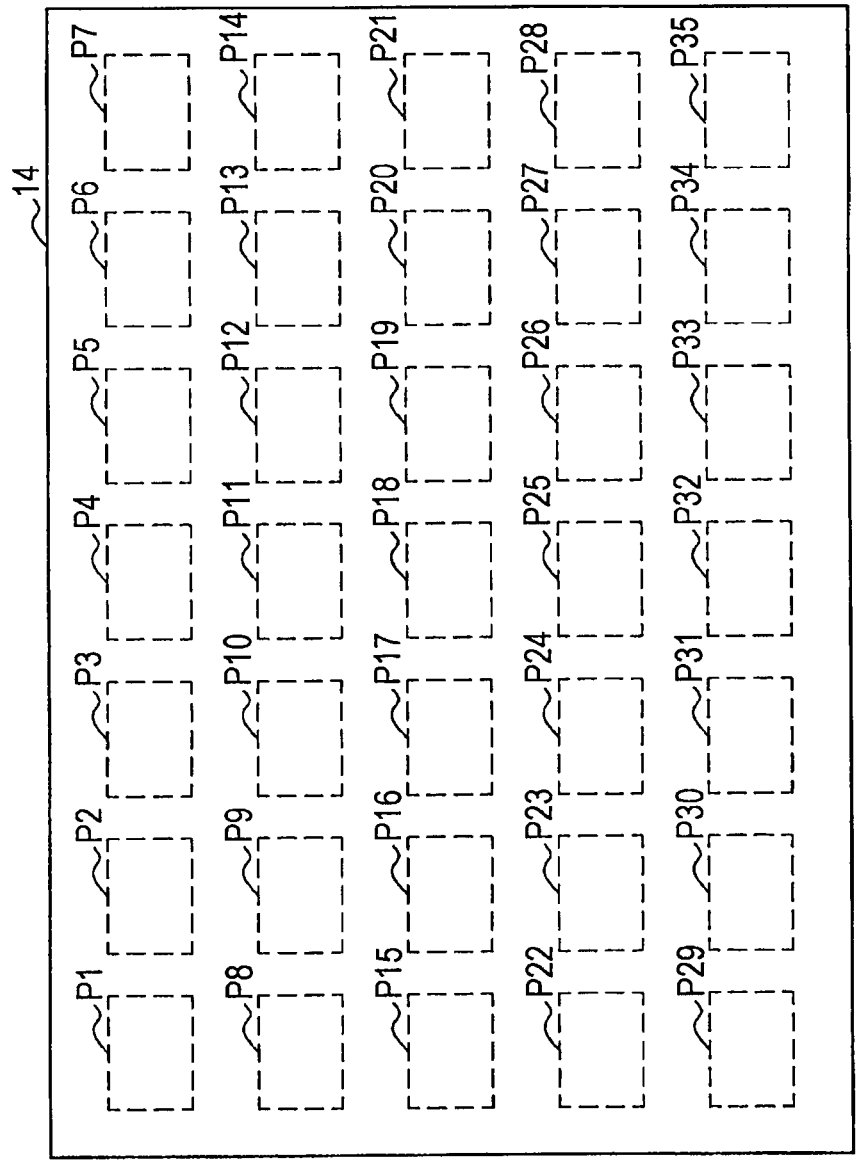
FIG. 2 illustrates a layout example of focus points.

The imaging apparatus 10 according to the present embodiment has focus points in a plurality of areas on the imaging plane, and thus can detect a focus state per focus point. For example, as shown in FIG. 2, focus points P1 through P35 are laid out in 35 areas on an imaging plane 14, and thus the imaging apparatus 10 can detect a degree of focus in each focus point.

Such imaging apparatus 10 obtains imaging information at the time of imaging an image, and as shown in FIG. 1, supplies an image file including an image and imaging information to the image processor 20. The imaging information includes, for example, focal length information indicating a focal length at the time of imaging an image and focus information. The focus information may also include information indicating a degree of focus in each focus point and information indicating a state of an optical system, such as a lens position at the time of imaging.

(Image Processor 20)

The image processor 20 has a function of applying various types of image processing to an image supplied from the imaging apparatus 10. For example, the image processor 20 is possible to apply miniaturization process to an image supplied from the imaging apparatus 10 using imaging information of the image. The miniaturization process is a process of applying blurring to a surrounding region around an attention region without blurring the attention region in the image, and this enables to obtain an image as a miniature with a shallow depth of field. A brief description is given below to the miniaturization process with reference to FIGS. 3 to 5.

Figure 3:
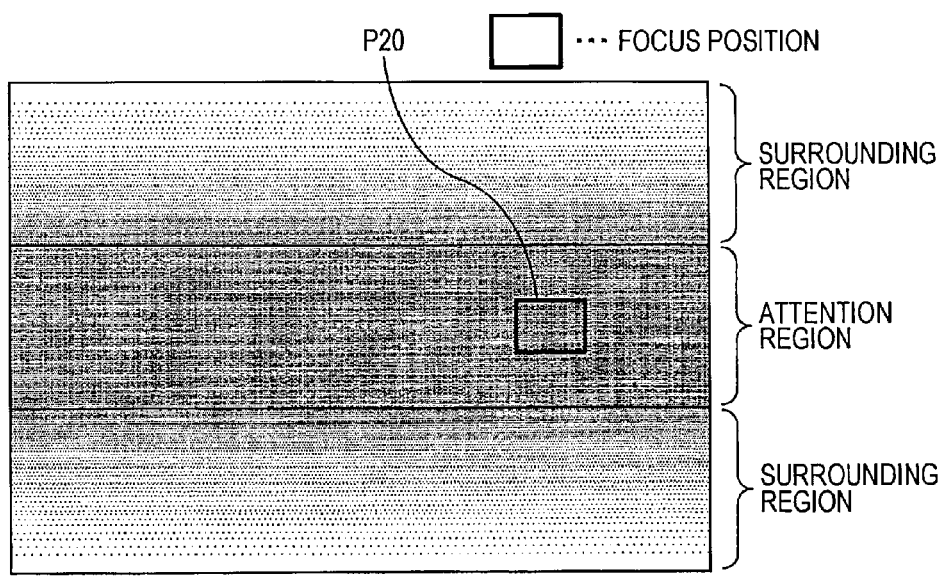
FIG. 3 illustrates miniaturization process.
Figure 4:
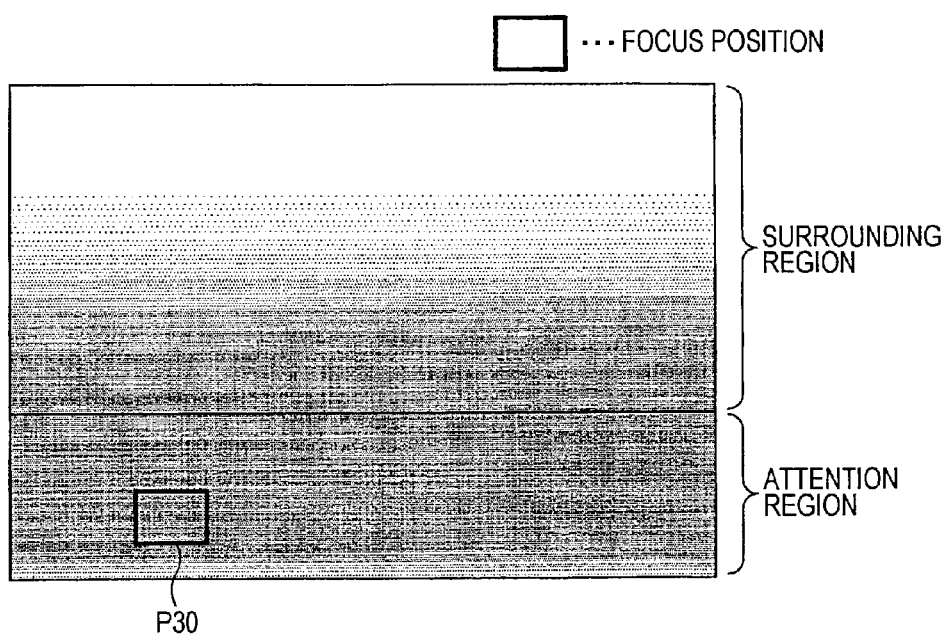
FIG. 4 illustrates miniaturization process.
Figure 5:
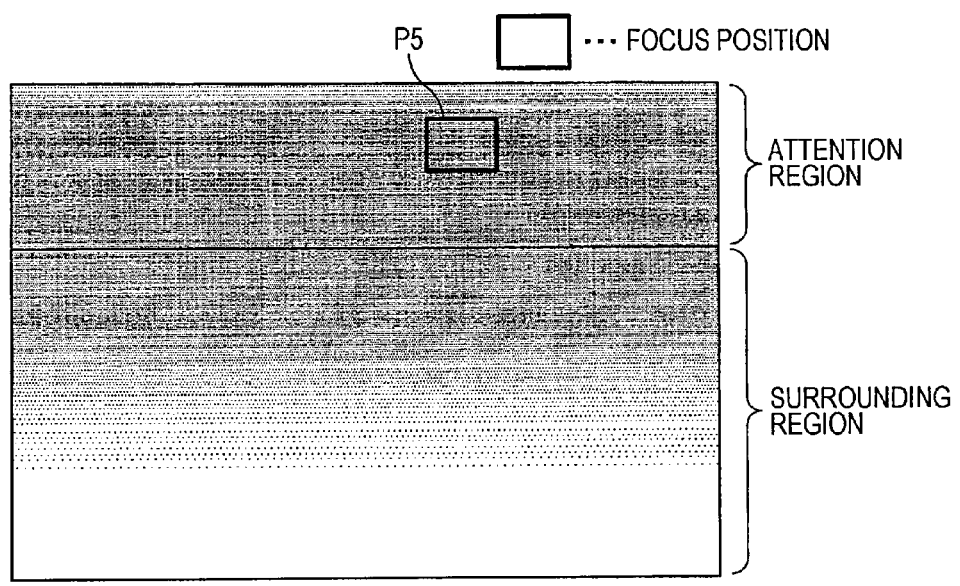
FIG. 5 illustrates miniaturization process.

FIGS. 3 to 5 illustrate the miniaturization process. In FIGS. 3 to 5, a degree of blurring in an image due to the miniaturization process is represented by density of color. That is, in FIGS. 3 to 5, a more blurred region is colored lighter.

As shown in FIG. 3, in a case that the focus point P20 near the center of the image is the only focus position in the image (that is, a position having the degree of focus beyond a threshold), a region including the focus point P20 is determined as the attention region. As shown in FIG. 4, in a case that the focus point P30 in a lower part of the image is the only focus position in the image, a region including the focus point P30 is determined as the attention region. Similarly, as shown in FIG. 5, in a case that the focus point P5 in an upper part of the image is the only focus position in the image, a region including the focus point P5 is determined as the attention region.

The image processor 20 then applies blurring to a surrounding region around the attention region centering on the attention region. Specifically, as shown in FIGS. 3 to 5, the image processor 20 applies stronger blurring with distance from the attention region. This enables to obtain an image as a miniature with a shallow depth of field. Alternatively, the image processor 20 may also apply blurring to the surrounding region around the focus position centering on the focus position.

Although an example of carrying out the miniaturization process as above in the image processor 20 is described in this specification, it is also possible to carry out the miniaturization process in the imaging apparatus 10 by providing a mechanism to carry out the miniaturization process in the imaging apparatus 10. In this case, the imaging apparatus 10 may carry out the miniaturization process after imaging an image and may also carry out the miniaturization process at the time of imaging an image.

Although a PC (personal computer) is shown as an example of the image processor 20, the image processor 20 is not limited to a PC. For example, the image processor 20 may also be an information processor, such as a home video processor (a DVD recorder, a video cassette recorder, and the like), a PDA (personal digital assistants), a home game console, and home appliances. The image processor 20 may also be an information processor, such as a mobile phone, a PHS (personal handyphone system), a portable video processor, and a portable game console.

(Background)

As described above, in a case that there is one focus position present in an image, an attention region can be determined so as to include the focus position. However, in practice, there is a case of containing a plurality of focus positions in an image. Specific examples of an image containing a plurality of focus positions are described below.

Figure 6:
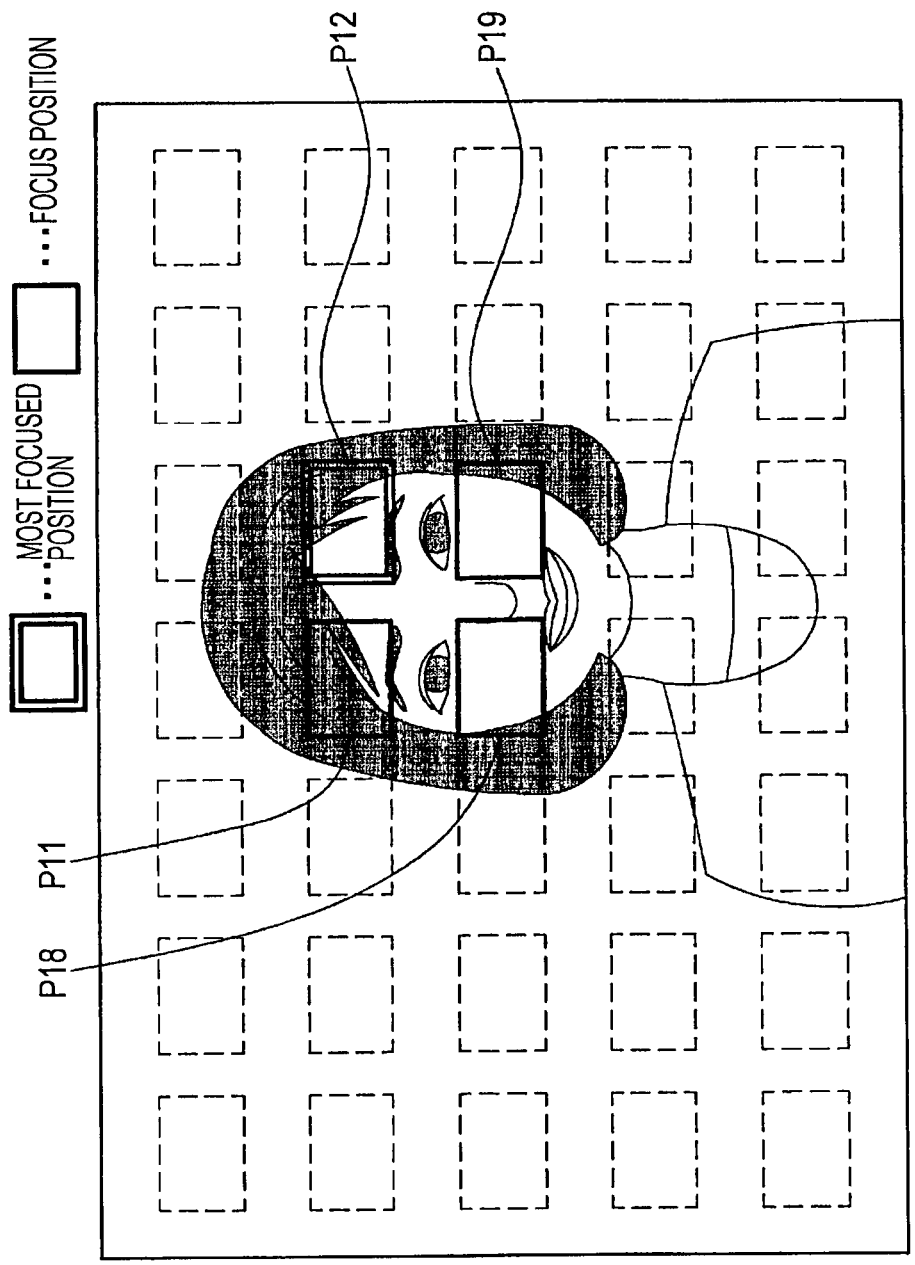
FIG. 6 illustrates a specific example of an image containing a plurality of focus positions.
Figure 7:
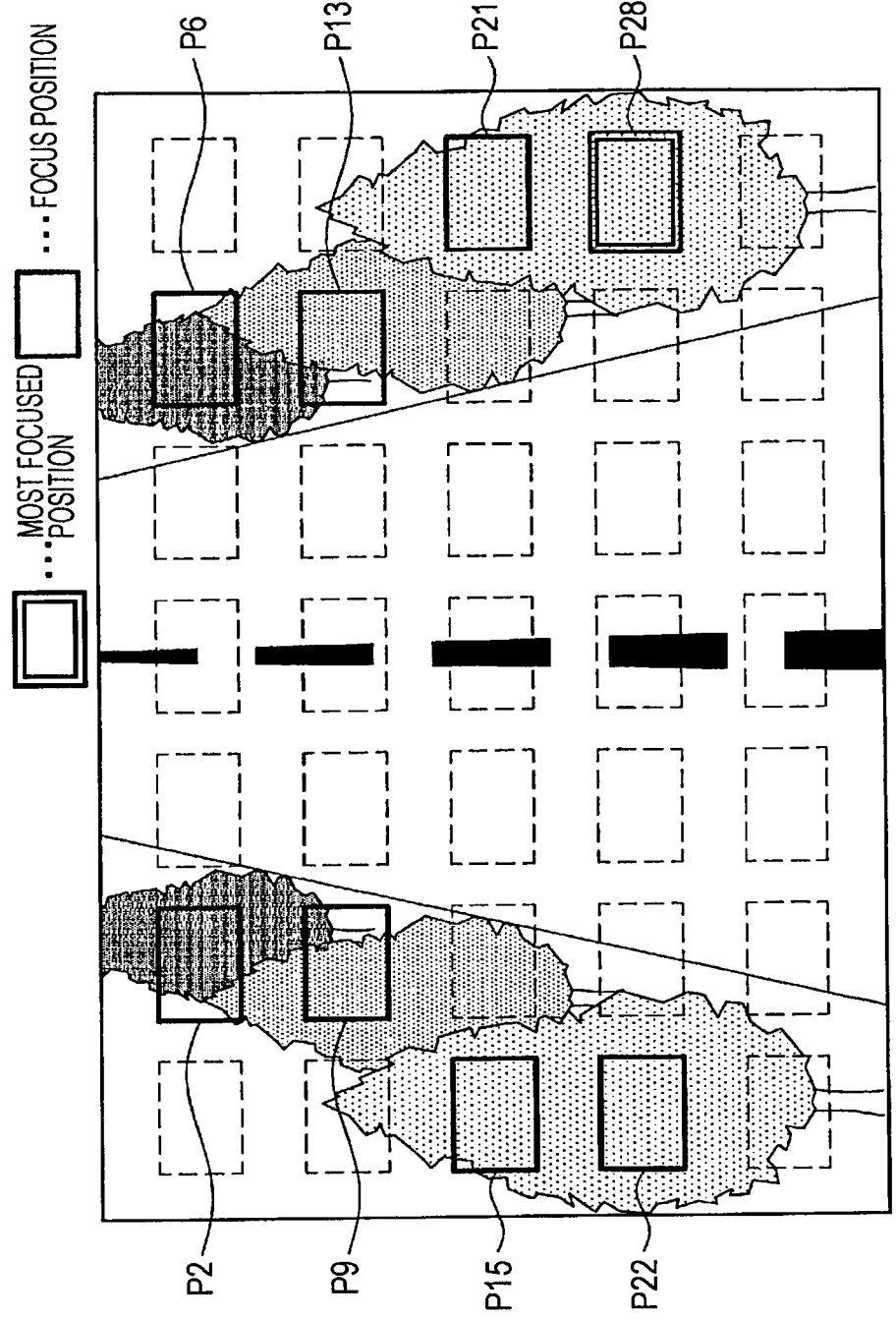
FIG. 7 illustrates another specific example of an image containing a plurality of focus positions.

FIGS. 6 and 7 illustrate specific examples of an image containing a plurality of focus positions. In an example shown in FIG. 6, the image is focused at focus points P11, P12, P18, and P19 corresponding to a face region of a person. Particularly, a degree of focus of the focus point P12 is highest.

In an example shown in FIG. 7, the image is focused at focus points P2, P6, P9, P13, P15, P21, P22, and P28 corresponding to regions of trees on roadsides. Particularly, a degree of focus of the focus point P28 is highest.

An approach to determine an attention region from such an image containing a plurality of focus positions may include an approach of determining the attention region to be a region including a most focused position and an approach of determining the attention region, considering a plurality of focus positions, to be a region including, for example, a position of a center of gravity of the plurality of focus positions.

However, a determined attention region may become different depending on an approach to be used. For example, in a case where the focus positions gather in one area as shown in FIG. 6, there is no significant difference in a determined attention region depending on each approach. In contrast, in a case that the focus positions scatter as shown in FIG. 7, a different attention region is determined with each approach. When the attention regions are thus different, the image finally obtained by the miniaturization process also becomes different, so that it is difficult to obtain a result expected by a user in a case of an inappropriate attention region.

With that, in view of the above situation, the image processor 20 according to the present embodiment has come to be made. The image processor 20 according to the present embodiment is possible to appropriately determine an attention region in the image based on the imaging information. Such image processor 20 according to the present embodiment is described in detail below.

<2. Configuration of Image Processor>

Figure 8:
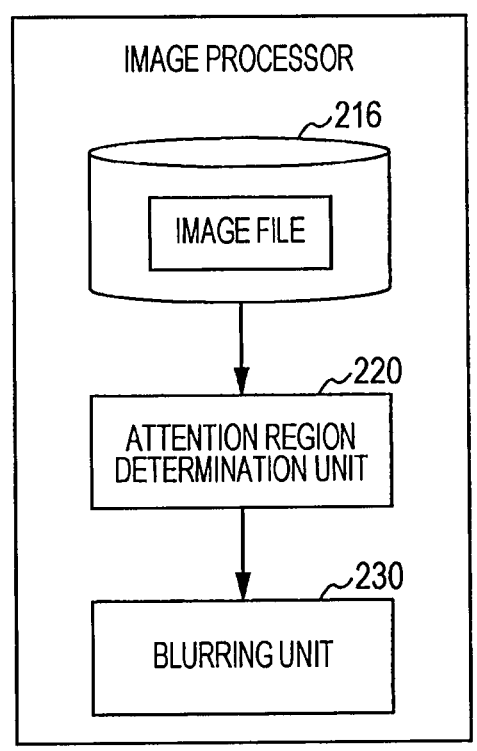
FIG. 8 illustrates a configuration of an image processor according to the present embodiment.

FIG. 8 illustrates a configuration of the image processor 20 according to the present embodiment. As shown in FIG. 8, the image processor 20 according to the present embodiment is provided with a storage unit 216, an attention region determination unit 220, and a blurring unit 230.

The storage unit 216 stores an image file made with an image and imaging information supplied from the imaging apparatus 10. The storage unit 216 may be a storage medium, such as a non-volatile memory, a magnetic disk, an optical disk, and an MO (magneto optical) disk.

The attention region determination unit 220 selects an approach, for an image stored in the storage unit 216, to determine an attention region based on imaging information of the image and determines an attention region of the image by the selected approach. An approach to determine an attention region may include an approach of determining the attention region to be a region including a most focused position and an approach of determining the attention region, considering a plurality of focus positions, to be a region including, for example, a position of a center of gravity of the plurality of focus positions.

Here, since a subject is hard to be focused with a shallow depth of field, a most focused position having a highest degree of focus in the image with a shallow depth of field is likely to be a user intended subject. In contrast, since many subjects are focused with a deep depth of field, a most focused position in the image with a deep depth of field may not be the only user intended subject. Therefore, as described in "3. Function of Image Processor" for details, the attention region determination unit 220 selects an approach to determine an attention region based on a depth of field at the time of imaging an image.

Although FIGS. 3 to 5 show an example in which the attention region is a region along a horizontal direction of the image, modes of the attention region are not limited to such example. For example, the attention region may also be a region along a vertical direction of the image, may also be a circular region, and may also be a rectangular region partially making up the horizontal and vertical directions.

The blurring unit 230 is an image processing unit applying blurring to a surrounding region around an attention region determined by the attention region determination unit 220. For example, the blurring unit 230 may also apply stronger blurring to a region distant from the attention region using a different low pass filter in accordance with the distance from the attention region.

<3. Function of Image Processor>

The configuration of the image processor 20 according to the present embodiment is described above. Subsequently, a functional example of the image processor 20 according to the present embodiment is described.

First Functional Example

Figure 9:
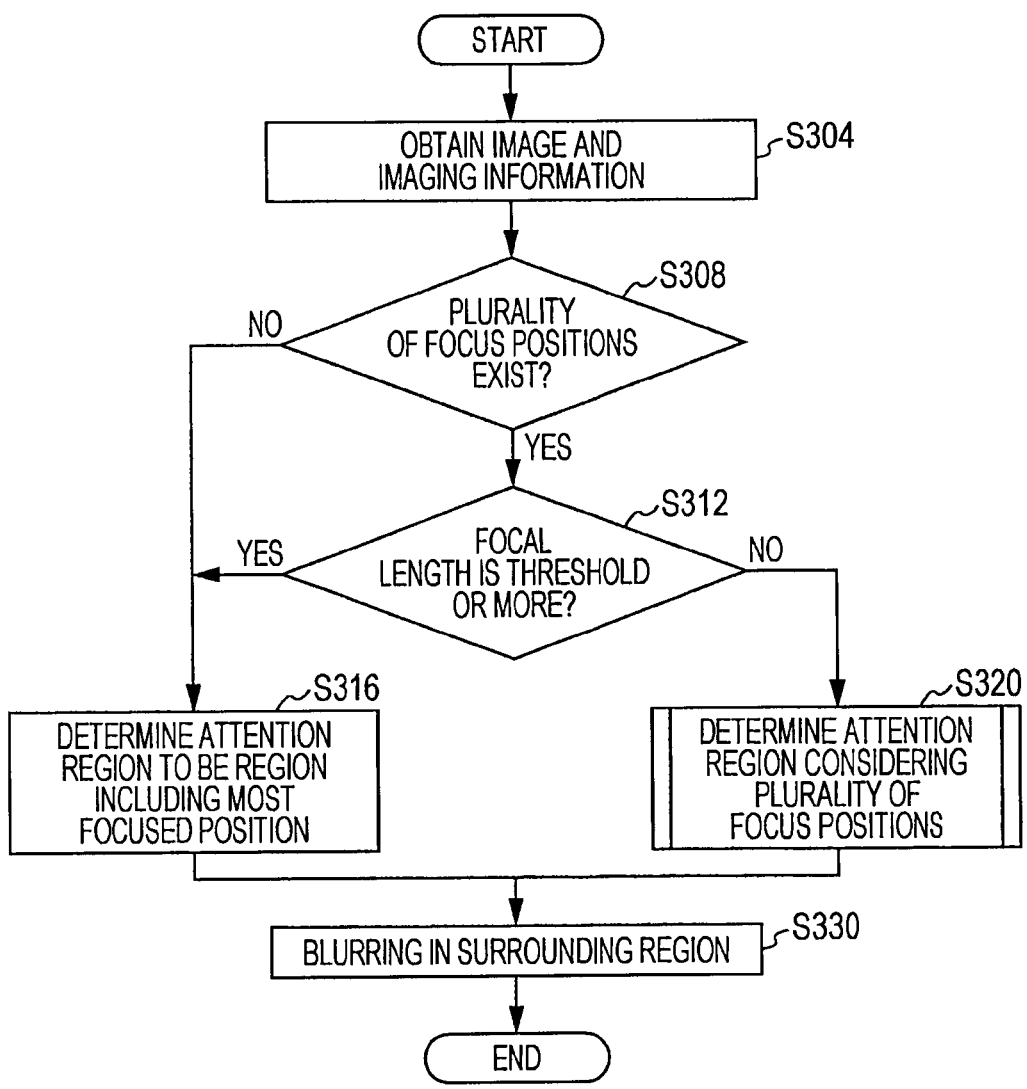
FIG. 9 is a flowchart showing a first functional example of an image processor.

FIG. 9 is a flowchart showing a first functional example of the image processor 20. As shown in FIG. 9, the attention region determination unit 220 of the image processor 20 firstly obtains an image subjected to processing and imaging information of the image (S304).

The attention region determination unit 220 then judges whether or not a plurality of focus positions are contained in the image based on focus information included in the imaging information (S308). Here, in a case a plurality of focus positions are not contained in the image, the attention region determination unit 220 determines the attention region to be a region including the most focused position in the image (S316). The judgment of whether or not a plurality of focus positions are contained in the image can be carried out by analyzing the image even in a case that there is no focus information. Similarly, it is also possible to detect a most focused position and focus position(s) by image analysis.

In contrast, in a case that a plurality of focus positions are contained in the image, the attention region determination unit 220 selects an approach of determining an attention region based on a focal length indicated by focal length information included in the imaging information (S312).

Specifically, since the depth of field becomes shallower with a longer focal length and the depth of field becomes deeper with a shorter focal length, the attention region determination unit 220 determines the attention region to be a region including the most focused position in a case that the focal length is a threshold or more (S316).

In a case that the focal length is less than a threshold, the attention region determination unit 220 determines the attention region by considering a plurality of focus positions (S320). As an example, the attention region determination unit 220 may also generically determine the attention region to be a region including, for example, a position of a center of gravity of the plurality of focus positions in a case that the focal length is less than a threshold. In a case that the focal length is less than a threshold, the attention region determination unit 220 may also determine the attention region by considering scattering of the plurality of focus positions as described with reference to FIG. 10.

Figure 10:
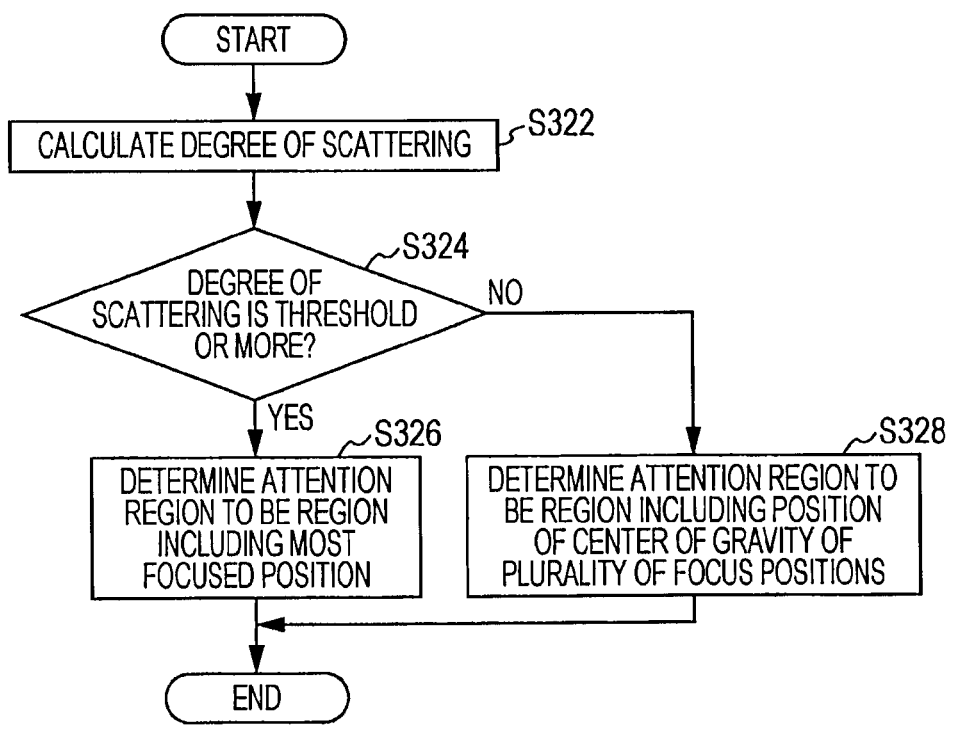
FIG. 10 is a flowchart showing a method of determining an attention region considering a plurality of focus positions.

FIG. 10 is a flowchart showing an approach of determining an attention region by considering scattering of a plurality of focus positions. As shown in FIG. 10, the attention region determination unit 220 firstly calculates a degree of scattering of a plurality of focus positions (S322). A method of calculating a degree of scattering is described later.

In a case that the degree of scattering is a threshold or more (S324), the attention region determination unit 220 then determines the attention region to be a region including the most focused position (S326). In contrast, in a case that the degree of scattering is less than a threshold (S324), the attention region determination unit 220 determines the attention region to be a region including, for example, a position of a center of gravity of the plurality of focus positions based on the plurality of focus positions (S328).

This determines the attention region to be a region including, for example, a position of a center of gravity of the plurality of focus positions for the image shown in FIG. 6 having a degree of scattering of focus positions of less than a threshold when, for example, the focal lengths of the images shown in FIGS. 6 and 7 are less than a threshold. In contrast, for the image shown in FIG. 7 having a degree of scattering of focus positions of a threshold or more, a region including the most focused position P28 is determined to be the attention region.

When the attention region is determined in S316 or S320 as above, the blurring unit 230 applies blurring to a surrounding region around the attention region as shown in FIG. 9 (S330).

As described above, according to the first functional example of the image processor 20, it becomes possible to appropriately determine the attention region in accordance with a focal length at the time of imaging an image. In addition, according to the first functional example of the image processor 20, in a case that there is a plurality of focus positions, it is possible to more appropriately determine the attention region by calculating a degree of scattering of the plurality of focus positions.

(Supplementary Explanation)

Figure 11:
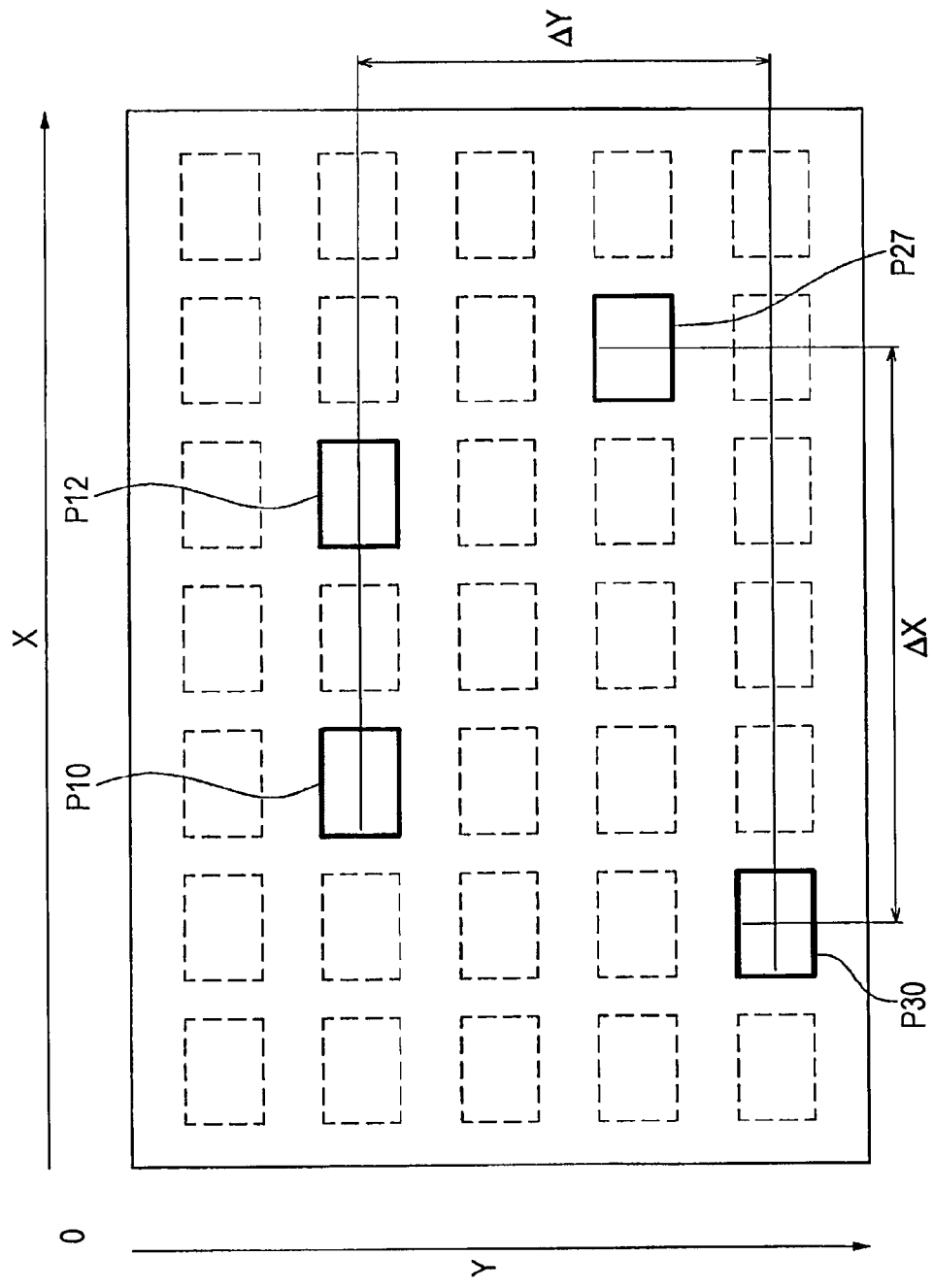
FIG. 11 illustrates a method of calculating a degree of scattering.
Figure 12:
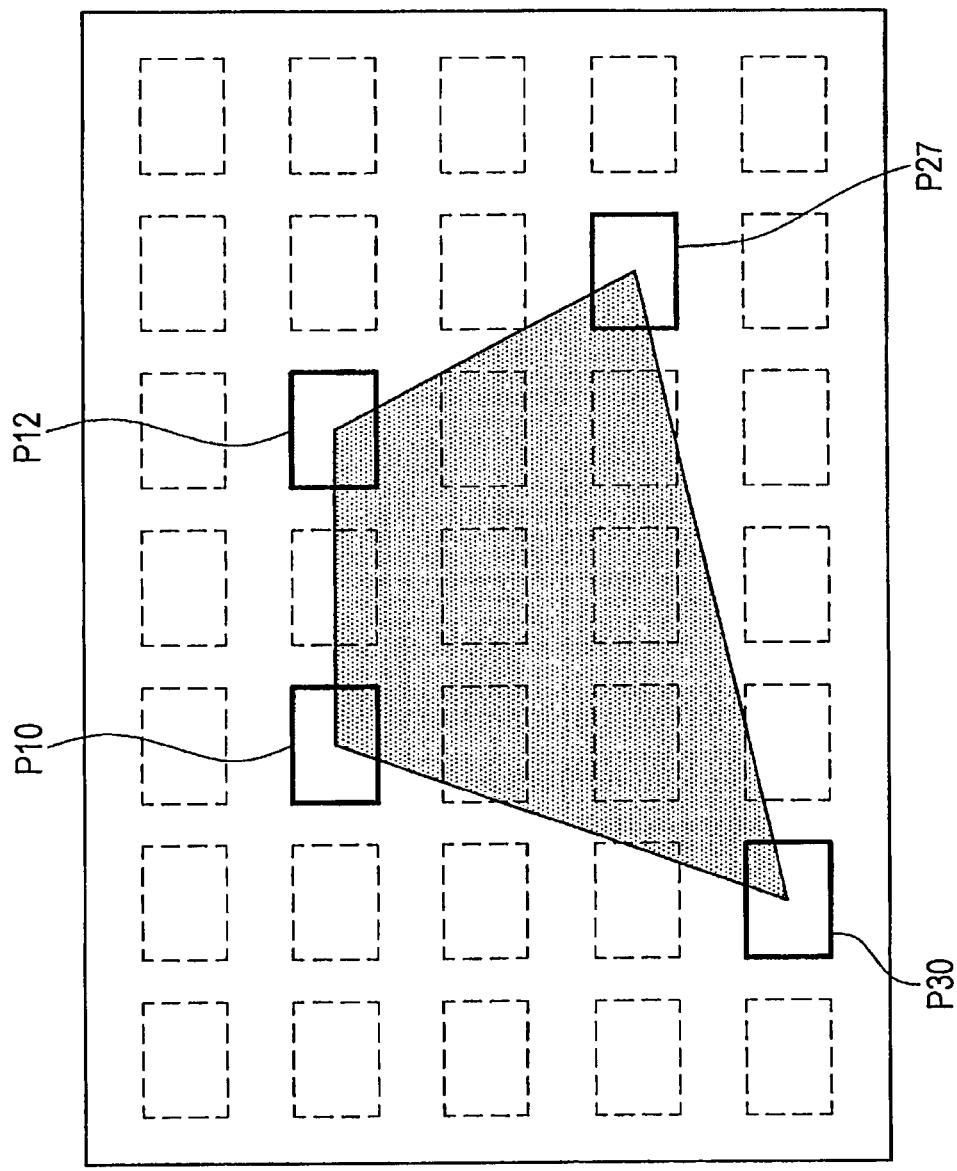
FIG. 12 illustrates a method of calculating a degree of scattering.

Here, with reference to FIGS. 11 and 12, a method for calculating a degree of scattering of focus positions in S322 by the attention region determination unit 220 is explained.

First Calculation Method

The attention region determination unit 220 firstly calculates a distance ΔX of a most horizontally (X direction) distant focus position following Equation (1) below, and calculates a distance ΔY of a most vertically (Y direction) distant focus position following Equation (2) below.

$$\Delta X = X\max - X\min \quad (1)$$

$$\Delta Y = Y\max - Y\min \quad (2)$$

As shown in FIG. 11, in a case that the focus points P10, P12, P27, and P30 are focus positions, ΔX represented by Equation 1 falls into a horizontal distance of the focus points P30 and P27. ΔY represented by Equation 2 falls into a vertical distance from P10 and P12 to P30.

The attention region determination unit 220 then calculates a degree of scattering following Equation 3 below using the distance ΔX and the distance ΔY.

$$\text{Degree of scattering} = \Delta X \cdot \Delta Y \quad (3)$$

A level of scattering of a plurality of focus positions in an image can be evaluated by a magnitude of the degree of scattering obtained from Equation 3 above. Although Equation 3 above shows an example of multiplying the distance ΔX and the distance ΔY, an operation to calculate a degree of scattering is not limited to such example, and it may also be, for example, adding of the distance ΔX and the distance ΔY. Such a configuration enables to avoid a case of calculating a degree of scattering as "0" in a case that either the distance ΔX or the distance ΔY is "0".

Second Calculation Method

Although a method of calculating degrees of horizontal and vertical scattering of focus positions is described in the first calculation method above, the attention region determination unit 220 may also calculate only a degree of either horizontal or vertical scattering of focus positions.

For example, in a case that the attention region is a region along a horizontal direction as shown in FIGS. 3 to 5, even though the focus positions scatter horizontally at an identical vertical position, the attention region including the most focused position agrees with the attention region including a position of a center of gravity of the plurality of focus positions. Therefore, in a case that the attention region is a region along a horizontal direction, it is considered that calculation of a degree of horizontal scattering of focus positions has less meaning.

With that, the attention region determination unit 220 may also calculate only a degree of scattering of focus positions in a direction (for example, vertical direction) crossing the direction (for example, horizontal direction) along the attention region. Such a configuration enables to simplify processing of the image processor 20.

Third Calculation Method

The attention region determination unit 220 may also calculate an area of a part including the plurality of focus positions as the degree of scattering. For example, as shown in FIG. 11, in a case that the focus points P10, P12, P27, and P30 are focus positions, the attention region determination unit 220 may also calculate an area of a part including the focus points P10, P12, P27, and P30 as the degree of scattering.

3-2. Second Functional Example

Figure 13:
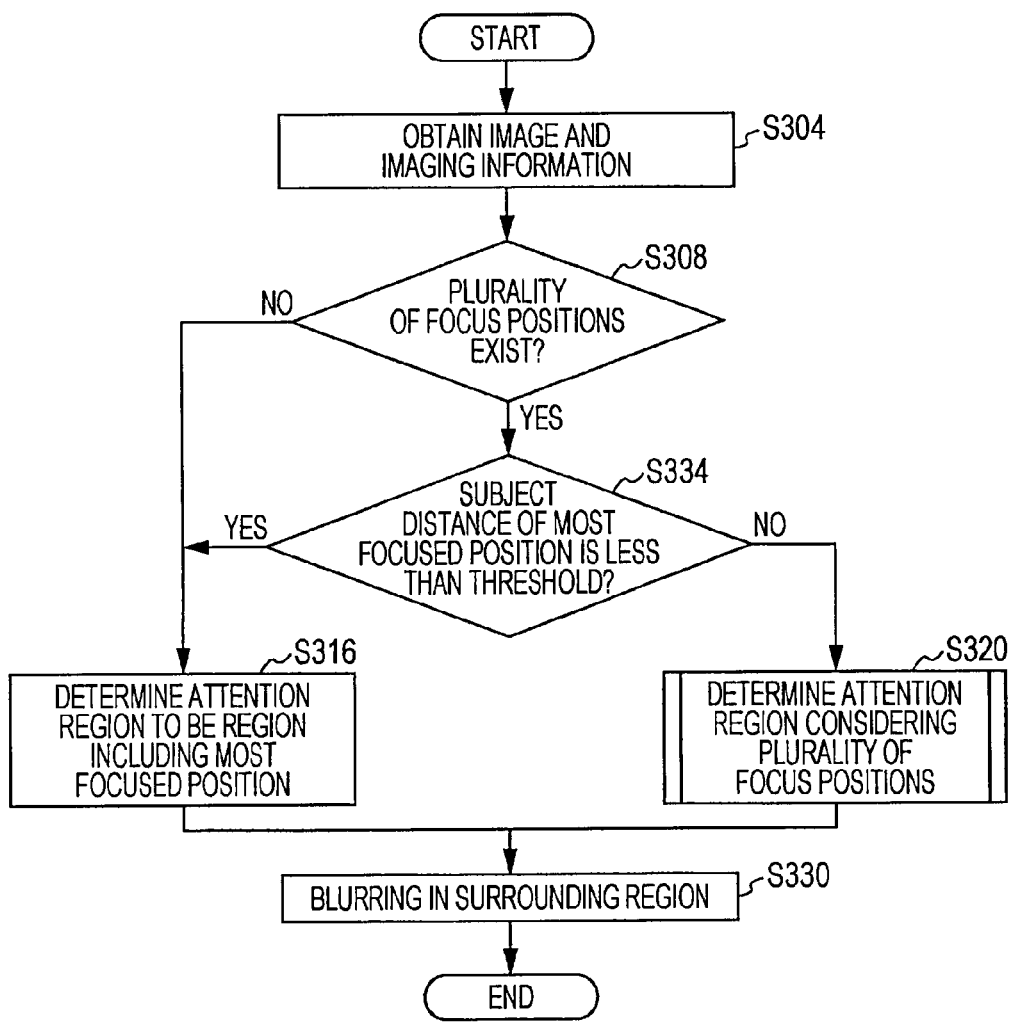
FIG. 13 is a flowchart showing a second functional example of an image processor.

FIG. 13 is a flowchart showing a second functional example of the image processor 20. As shown in FIG. 13, the attention region determination unit 220 of the image processor 20 firstly obtains an image subjected to processing and imaging information of the image (S304).

The attention region determination unit 220 then judges whether or not a plurality of focus positions are contained in the image based on focus information included in the imaging information (S308). Here, in a case a plurality of focus positions are not contained in the image, the attention region determination unit 220 determines the attention region to be a region including the most focused position in the image (S316).

In contrast, in a case that a plurality of focus positions are contained in the image, the attention region determination unit 220 selects an approach of determining an attention region based on whether or not a subject distance at a most focused position obtained from focus information included in the imaging information is less than a threshold (S334).

Specifically, since the depth of field becomes shallower with a nearer subject distance and the depth of field becomes deeper with a farther subject distance, the attention region determination unit 220 determines the attention region to be a region including the most focused position in a case that the subject distance at a most focused position is less than a threshold (S316). In contrast, in a case that the subject distance at a most focused position is a threshold or more, the attention region determination unit 220 determines the attention region by considering a plurality of focus positions (S320). For example, the attention region determination unit 220 may also determine the attention region to be a region including, for example, a position of a center of gravity of the plurality of focus positions as described in the first functional example, and may also determine the attention region by considering the scattering of the plurality of focus positions.

<4. Hardware Configuration>

The image processing by the image processor 20 described above works in cooperation with hardware included in the image processor 20 described below with reference to FIG. 14.

Figure 14:
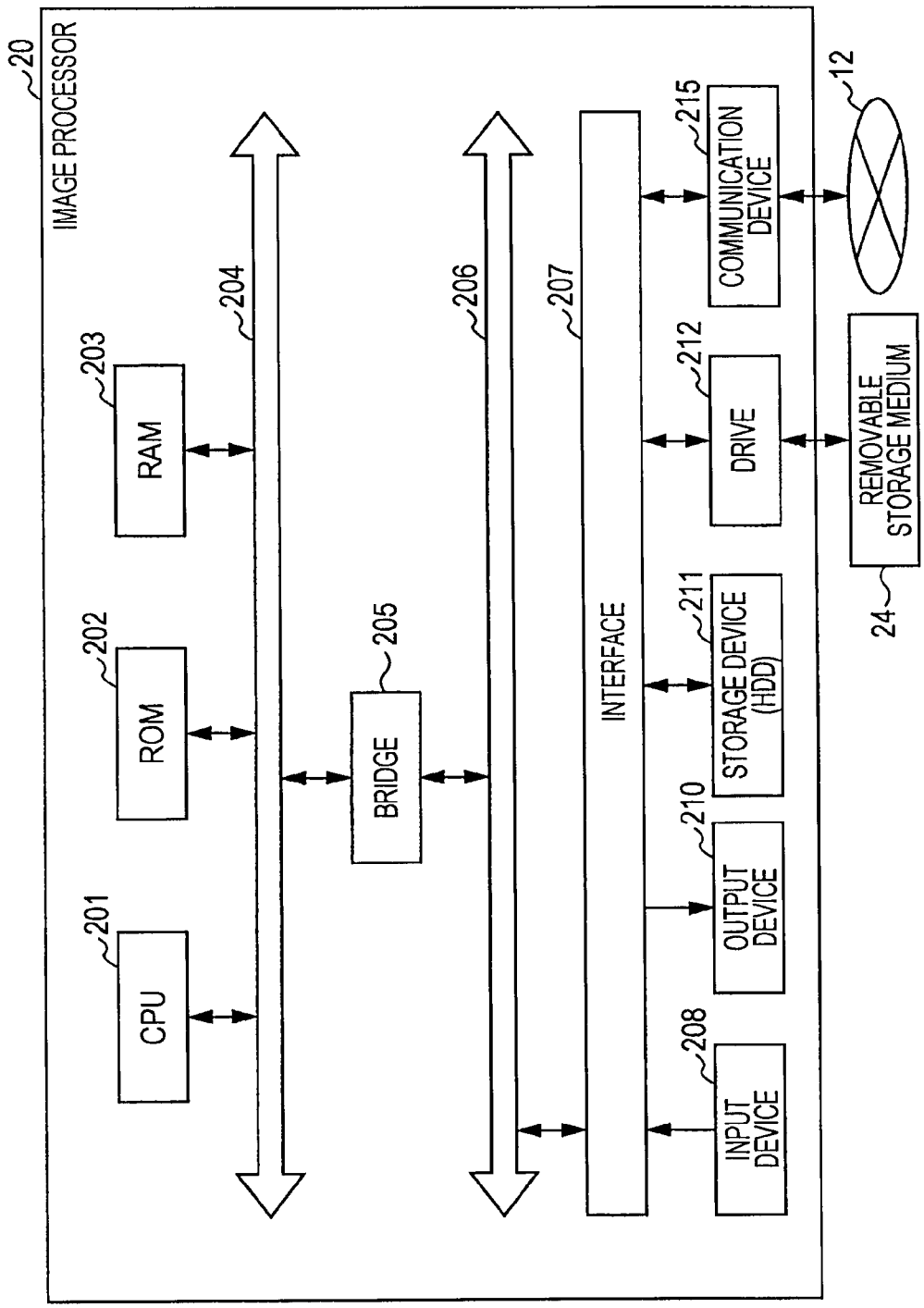
FIG. 14 is a block diagram showing a hardware configuration of an image processor.

FIG. 14 is a block diagram showing a hardware configuration of the image processor 20. The image processor 20 is provided with a CPU (central processing unit) 201, a ROM (read only memory) 202, a RAM (random access memory) 203, and a host bus 204. The image processor 20 is also provided with a bridge 205, an external bus 206, an interface 207, an input device 208, an output device 210, a storage device (HDD) 211, a drive 212, and a communication device 215.

The CPU 201 functions as an arithmetic processing unit and a control device, and controls overall functions in the image processor 20 following various programs. The CPU 201 may also be a microprocessor. The ROM 202 stores programs, operational parameters, and the like used by the CPU 201. The RAM 203 temporarily stores programs used in execution of the CPU 201, parameters varying appropriately in execution thereof, and the like. These are connected with each other by the host bus 204 configured with a CPU bus and the like.

The host bus 204 is connected with the external bus 206, such as a PCI (peripheral component interconnect/interface) bus, via the bridge 205. The host bus 204, the bridge 205, and the external bus 206 do not have to be configured separately, and these functions may also be implemented in one bus.

The input device 208 is configured with an input mechanism, such as a mouse, a keyboard, a touchscreen, a button, a microphone, a switch, and a lever, for a user to input information, an input control circuit generating an input signal based on an input by a user and outputting it to the CPU 201, and the like. A user of the image processor 20 can input various types of data and instruct processing functions to the image processor 20 by operating the input device 208.

The output device 210 includes a display device, such as a CRT (cathode ray tube) display device, a liquid crystal display (LCD) device, an OLED (organic light emitting diode) device, and a lamp, for example. Further, the output device 210 includes an audio output device, such as a speaker and headphones. The output device 210 outputs, for example, reproduced contents. Specifically, the display device indicates various types of information, such as reproduced video data, in text or image. Meanwhile, the audio output device outputs reproduced audio data or the like by converting it into audio.

The storage device 211 is a device for data storage configured as an example of a storage unit of the image processor 20 according to the present embodiment. The storage device 211 may also include a storage medium, a recording device recording data in the storage medium, a reading device reading out data from the storage medium, a deletion device deleting data recorded in the storage medium, and the like. The storage device 211 is configured with, for example, an HDD (hard disk drive). The storage device 211 drives a hard disk and stores programs, executed by the CPU 201, and various types of data.

The drive 212 is a reader writer for a storage medium and is built in or attached externally to the image processor 20. The drive 212 reads out information recorded in an attached removable storage medium 24, such as a magnetic disk, an optical disk, a magneto-optical disk, or a semiconductor memory, to output it to the RAM 203. The drive 212 can also write information in the removable storage medium 24.

The communication device 215 is a communication interface configured with, for example, a communication device or the like to be connected with a communication network 12. The communication device 215 may also be a wireless LAN (local area network) enabled communication device, an LTE (long term evolution) enabled communication device, and a wired communication device carrying out wired communication.

<5. Closing>

As described above, according to the image processor 20 of the present embodiment, since an attention region can be determined based on information related to a depth of field out of imaging information, it is possible to obtain a miniature effect suitable for an image. According to the image processor 20 of the present embodiment, in a case that a plurality of focus positions exist, it becomes possible to more appropriately determine an attention region by calculating a degree of scattering of a plurality of focus positions.

Although preferred embodiments of the present disclosure are described in detail with reference to the attached drawings, the technical scope of embodiments of the present disclosure is not limited to such examples. It is apparent that those skilled in the art of the embodiments of the present disclosure can think of various modifications or corrections within a scope of the technical ideas according to the embodiments of the present disclosure, and these are naturally understood to belong to the technical scope of embodiments of the present disclosure.

For example, each step in processing of the image processor 20 in this specification does not have to be processed sequentially in the order described as the flowcharts. For example, each step in processing of the image processor 20 may also be processed in order different from the order described as the flowcharts and may also be processed in parallel.

It is also possible to create a computer program to cause hardware, such as the CPU 201, the ROM 202, and the RAM 203 built in the image processor 20, to exhibit a function equivalent to each configuration of the image processor 20 described above. A storage medium having the computer program stored therein is also provided.

In addition, configurations as below also belong to the technical scope of embodiments of the present disclosure.

(1) An apparatus including:

an attention region determining unit, including a processor, configured to determine an attention region of an image that includes an intended subject of the image; and a blurring unit configured to blur all of the image regions outside of the attention region.

(2) The apparatus according to (1), wherein the attention region determining unit determines the attention region based on focal length information of the image.

(3) The apparatus according to (2), wherein the attention region determining unit determines the attention region based on a focal length of the image.

(4) The apparatus according to (2), wherein the attention region determining unit determines the attention region based on a distance to a subject located in a most focused portion of the image.

(5) The apparatus according to (4), wherein the attention region determining unit determines the attention region to be a region including a most focused position when a subject distance of the most focused position exceeds a threshold.

(6) The apparatus according to (5), wherein the attention region determining unit determines the attention region based on a plurality of focus positions when a subject distance of the most focused position does not exceed a threshold.

(7) The apparatus according to (1) to (6), further comprising:

a focus state determining unit configured to determine a focus state at a plurality of points of the image.

(8) The apparatus according to (7), wherein the attention region determining unit determines the attention region based on a distance to a subject located at a point from among the plurality of points with a highest focus state.

(9) The apparatus according to (7), wherein the attention region determining unit determines the attention region to be a region including a point from among the plurality of points with a highest focus state when a focal length of the point from among the plurality of points with the highest focus state exceeds a threshold.

(10) The apparatus according to (9), wherein the attention region determining unit determines the attention region based on at least two of the plurality of points when the focal length of the point from among the plurality of points with the highest focus state does not exceed the threshold.

(11) The apparatus according to (7), wherein the attention region determining unit determines the attention region based on a degree of scattering of at least two of the plurality of points in the image.

(12) The apparatus according to (1), wherein the attention region determining unit determines the attention region based on a degree of scattering of a plurality of focus positions in the image.

(13) The apparatus according to (12), wherein the attention region determining unit determines the attention region to be a region including a most focused position when the degree of scattering of the plurality of focus positions in the image exceeds a threshold.

(14) The apparatus according to (13), wherein the attention region determining unit determines the attention region to be a region including a center of gravity of at least two focus positions when the degree of scattering of the plurality of focus positions in the image does not exceed the threshold.

(15) A method including:
    determining, using a processor, an attention region of an image that includes an intended subject of the image; and
    blurring all of the image regions outside of the attention region.

(16) The method according to (15), wherein the determining includes determining the attention region based on focal length information of the image.

(17) The method according to (16), wherein the determining includes determining the attention region based on a focal length of the image.

(18) The method according to (16), wherein the determining includes determining the attention region based on a distance to a subject located in a most focused portion of the image.

(19) The method according to (15), wherein the determining includes determining the attention region based on a degree of scattering of a plurality of focus positions in the image.

(20) A non-transitory computer readable medium encoded with a program that, when loaded on a processor, causes the processor to perform a method including:
    determining, using a processor, an attention region of an image that includes an intended subject of the image; and
    blurring all of the image regions outside of the attention region.

What is claimed is:

1. An apparatus comprising:
    circuitry configured to:
    determine an attention region of an image that includes an intended subject of the image; and
    blur all image regions outside of the attention region, wherein
    the attention region is determined to be a region including a most focused position in the image when a single focus position is determined to be contained in the image and/or when a focal length corresponding to the image is equal to or exceeds a predetermined threshold, and
    the attention region is determined by considering a plurality of focus positions in the image when the plurality of focus positions are determined to be contained in the image and when the focal length corresponding to the image is less than the predetermined threshold.

2. The apparatus according to claim 1, wherein the circuitry is configured to determine the attention region based on focal length information corresponding to the image.

3. The apparatus according to claim 2, wherein the circuitry is configured to determine the attention region based on a distance to a subject located in the most focused portion of the image.

4. The apparatus according to claim 3, wherein the circuitry is configured to determine the attention region to be a region including the most focused position when the distance to the subject located in the most focused position of the image exceeds a threshold.

5. The apparatus according to claim 4, wherein the circuitry is configured to determine the attention region based on the plurality of focus positions when the distance to the subject located in the most focused position of the image does not exceed the threshold.

6. The apparatus according to claim 1, further comprising:
    focus state determining circuitry configured to determine a focus state at a plurality of points of the image.

7. The apparatus according to claim 6, wherein the circuitry is configured to determine the attention region based on a distance to a subject located at a point from among the plurality of points with a highest focus state.

8. The apparatus according to claim 6, wherein the circuitry is configured to determine the attention region to be a region including a point from among the plurality of points with a highest focus state when a focal length corresponding to the point from among the plurality of points with the highest focus state exceeds a threshold.

9. The apparatus according to claim 8, wherein the circuitry is configured to determine the attention region based on at least two of the plurality of points when the focal length corresponding to the point from among the plurality of points with the highest focus state does not exceed the threshold.

10. The apparatus according to claim 6, wherein the circuitry is configured to determine the attention region based on a degree of scattering of at least two of the plurality of points in the image.

11. The apparatus according to claim 1, wherein the circuitry is configured to determine the attention region based on a degree of scattering of the plurality of focus positions in the image.

12. The apparatus according to claim 11, wherein the circuitry is configured to determine the attention region to be a region including the most focused position when the degree of scattering of the plurality of focus positions in the image exceeds a threshold.

13. The apparatus according to claim 12, wherein the circuitry is configured to determine the attention region to be a region including a center of gravity of at least two focus positions when the degree of scattering of the plurality of focus positions in the image does not exceed the threshold.

14. A method comprising:
    determining, using a processor, an attention region of an image that includes an intended subject of the image; and
    blurring all image regions outside of the attention region, wherein
    the attention region is determined to be a region including a most focused position in the image when a single focus position is determined to be contained in the image and/or when a focal length corresponding to the image is equal to or exceeds a predetermined threshold, and
    the attention region is determined by considering a plurality of focus positions in the image when the plurality of focus positions are determined to be contained in the image and when the focal length corresponding to the image is less than the predetermined threshold.

15. The method according to claim 14, wherein the determining includes determining the attention region based on focal length information corresponding to the image.

16. The method according to claim 15, wherein the determining includes determining the attention region based on a distance to a subject located in the most focused portion of the image.

17. The method according to claim 14, wherein the determining includes determining the attention region based on a degree of scattering of the plurality of focus positions in the image.

18. A non-transitory computer readable medium encoded with a program that, when loaded on a processor, causes the processor to perform a method comprising:

determining, using a processor, an attention region of an image that includes an intended subject of the image; and blurring all image regions outside of the attention region, wherein the attention region is determined to be a region including a most focused position in the image when a single focus position is determined to be contained in the image and/or when a focal length corresponding to the image is equal to or exceeds a predetermined threshold, and the attention region is determined by considering a plurality of focus positions in the image when the plurality of focus positions are determined to be contained in the image and when the focal length corresponding to the image is less than the predetermined threshold.

* * * * *